(12) United States Patent
Mohapatra

(10) Patent No.: US 10,970,477 B1
(45) Date of Patent: Apr. 6, 2021

(54) COMPUTER-IMPLEMENTED METHODS SYSTEMS AND ARTICLES OF MANUFACTURE FOR AUTOMATED CONSTRUCTION OF COMPUTER-GENERATED USER INTERFACE

(71) Applicant: INTUIT INC., Mountain View, CA (US)

(72) Inventor: Deepankar Mohapatra, The Colony, TX (US)

(73) Assignee: INTUIT INC., Mountain View, CA (US)

( * ) Notice: Subject to any disclaimer, the term of this patent is extended or adjusted under 35 U.S.C. 154(b) by 382 days.

(21) Appl. No.: 15/860,462

(22) Filed: Jan. 2, 2018

(51) Int. Cl.
*G06F 40/174* (2020.01)
*G06F 40/186* (2020.01)
*G06Q 40/00* (2012.01)

(52) U.S. Cl.
CPC .......... *G06F 40/174* (2020.01); *G06F 40/186* (2020.01); *G06Q 40/12* (2013.12); *G06Q 40/123* (2013.12)

(58) Field of Classification Search
CPC .... G06F 40/174; G06F 40/186; G06Q 40/123
See application file for complete search history.

(56) References Cited

U.S. PATENT DOCUMENTS

| | | | |
|---|---|---|---|
| 5,842,185 A | 11/1998 | Chancey et al. | |
| 9,760,953 B1 | 9/2017 | Wang et al. | |
| 2004/0236651 A1* | 11/2004 | Emde | G06Q 20/389 705/34 |
| 2006/0178961 A1 | 8/2006 | Stanley et al. | |
| 2012/0109792 A1* | 5/2012 | Eftekhari | G06F 21/31 705/31 |
| 2012/0136764 A1 | 5/2012 | Miller et al. | |
| 2014/0337189 A1* | 11/2014 | Barsade | G06Q 40/123 705/31 |

(Continued)

OTHER PUBLICATIONS https://ttlc.intuit.com/questions/1901004-what-is-proseries-what-is-lacerte, printed: Jan. 2, 2018.

(Continued)

*Primary Examiner* — Scott T Baderman
*Assistant Examiner* — Seung Woon Jung
(74) *Attorney, Agent, or Firm* — DLA Piper LLP (US)

(57) ABSTRACT

Computerized systems and methods for automatic construction of computer-generated user interfaces that reduce questions presented by electronic document preparers to customers. Embodiments result in more efficient question presentation and answering of same and more efficient and accurate electronic document data while reducing customer confusion by eliminating extraneous questions or content that are not relevant to a preparer's information request or that obfuscate relevant preparer inquiries. Fillable portions of one or more electronic forms or templates are extracted and aggregated to construct a new user interface or interview screen that is independent of an electronic document preparation application utilized by the preparer and presented to the customer. Customer responses provided through the constructed user interface are stored to a data store shared with the electronic document preparation application to update the current electronic document data.

30 Claims, 13 Drawing Sheets

(56) References Cited

U.S. PATENT DOCUMENTS

2017/0032468 A1    2/2017    Wang et al.
2017/0220540 A1    8/2017    Wang et al.
2018/0089159 A1*  3/2018    Jain ........................ H04L 67/06

OTHER PUBLICATIONS https://proconnect.intuit.com/lacerte/, printed: Jan. 2, 2018.
https://proconnect.intuit.com/proseries/; printed: Jan. 2, 2018.
https://proconnect.intuit.com/link/faqs/, printed: Jan. 2, 2018.
https://proconnect.intuit.com/client-connection-suite/#link; printed: Jan. 2, 2018.

* cited by examiner

| | A | B | C | D | E | F | G | Goal |
|---|---|---|---|---|---|---|---|---|
| R1 | Y | ? | N | ? | ? | ? | ? | Yes |
| R2 | Y | ? | Y | ? | ? | ? | Y | Yes |
| R3 | N | Y | ? | ? | Y | ? | Y | Yes |
| R4 | N | Y | ? | ? | N | N | ? | Yes |
| R5 | N | N | ? | N | ? | N | ? | Yes |

SUPPLEMENTAL INTERVIEW SCREEN FOR CUSTOMER

SPOUSE INFORMATION

914d →

| | | | |
|---|---|---|---|
| SOCIAL SECURITY # | TAG | ☐ | ─912d |

TAXPAYER CONTACT INFORMATION 914q-v →

| | | |
|---|---|---|
| SOCIAL SECURITY # | TAG | ☐ |
| HOME TELEPHONE # | TAG | ☐ |
| WORK TELEPHONE # | TAG | ☐ |
| WORK EXTENSION | TAG | ☐ |
| DAYTIME TELEPHONE # | TAG | ☐ |
| MOBILE PHONE | TAG | ☐ |
| FAX NUMBER | TAG | ☐ |

─912q-v

4TH QUARTER (DUE 1/17/19)

924a-c →

| | | |
|---|---|---|
| VOUCHER AMOUNT | TAG | ☐ |
| AMOUNT PAID | TAG | ☐ |
| DATE | TAG | ☐ |

─922a-c

PAID WITH EXTENSION (NOT LATER THAN 4/17/18)

924n-o →

| | | |
|---|---|---|
| AMOUNT PAID | TAG | ☐ |
| DATE | TAG | ☐ |

─922n-o

BUSINESS INCOME - EXPENSES 934a-b →

| | | |
|---|---|---|
| ADVERTISING | TAG | ☐ |
| EMPLOYEE BENEFITS | TAG | ☐ |

COMPUTER-IMPLEMENTED METHODS SYSTEMS AND ARTICLES OF MANUFACTURE FOR AUTOMATED CONSTRUCTION OF COMPUTER-GENERATED USER INTERFACE

FIELD OF THE TECHNOLOGY

The present invention relates to technical fields of interactive computer-generated user interfaces and computing systems and methods for generating interactive user interfaces.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

Embodiments address technical restrictions and inflexibility of known computer generated user interfaces including pre-defined and static user interfaces generated by electronic document generation applications that allow a user to enter data into fields to create electronic forms or documents. Such user interfaces are structured with a fixed configuration so that the electronic document generation application can be used by various users in a predictable and reliable manner to consistently generate populated forms or documents. While pre-determined or fixed user interfaces may be beneficial and even preferred from the perspective electronic document generation application providers and since multiple users are utilizing the same electronic document generation application, electronic requests by electronic document preparers to customers regarding electronic forms of electronic document generation applications having pre-determined or fixed structure often include extraneous information or portions of an electronic form that are not relevant to a request, thereby obfuscating relevant what actually has to be addressed by the customer. A customer may also be required to engage in additional interactions with a computing device or electronic form or engage in additional communications with the preparer to clarify the preparer's request due to extraneous information in the request. Thus, these pre-determined user interface structures can complicate the process of electronic document generation and may also result in document or data entry errors since a customer may answer some questions but not others or answer a question incorrectly as a result of being presented with extraneous information or fields not required to be addressed by the customer.

SUMMARY

Embodiments of the present invention address restrictions and inefficiencies of known electronic document applications, user interfaces generated thereby and preparer-customer communications to obtain data for electronic forms or an electronic document being prepared using the electronic document preparation application.

Embodiments of the invention transform a pre-determined or fixed user interface of electronic forms or templates defined by an electronic document preparation and utilized to prepare an electronic document into a customized and more efficient and substantively relevant user interface for a different, second user or customer for which a first user is preparing an electronic document. The generated user interface includes selected portions of one or more pre-defined and static electronic form defined by the electronic document preparation application. Automatic generation of a new user interface or interview experience eliminates or reduces the need for electronic document preparers to send electronic messages to the customer to request information from the customer and/or reduces the need for customers to send electronic messages to preparers regarding questions about the preparer's requests to clarify what information is actually needed. For example, a preparer may only require certain information to populate a few fields of an electronic form or template, but the preparer may send the complete electronic form or template or additional information to the preparer when it is not necessary to do so.

With embodiments, a customized computer generated interactive user interface that is more user friendly and not structured according to a rigid "form" or "template" format includes selected questions and associated fillable fields extracted or copied from one or more electronic forms or documents determined to be pertinent to the customer. Embodiments thus filter out extraneous information or requests and eliminate unnecessary electronic communications and consumption of computing and network resources for extra preparer-customer communications and manual data entry by the preparer into an electronic form or electronic document being prepared. Selective extraction as executed by embodiments is defined as selectively copying a portion of a pre-defined electronic form or input sheet, copying a field to be populated, associated question or text description and associated software code for implementing presentation of the text description or question and population of the field. Thus, "extraction" does not mean deleting the portion from the electronic form or input sheet itself since the electronic form or input sheet is a component of and defined by the electronic document preparation application.

Embodiments of the invention provide for efficient determination of electronic document data and updates to electronic data for an electronic document or forms thereof in a data store by utilizing a non-generic arrangement of computing components including multiple interface controllers. A first interface controller is a component of or utilized by the electronic document preparation application, and a second interface controller is executed independently of the first interface controller. Both interface controllers share a common data store execute respective electronic data updates such that data received by the second interface controller via a customized user interface is utilized to update the current electronic document data, which is then read by the first interface controller for automatic population and electronic form or document updates for the electronic document preparation application.

Embodiments of the invention also provide for rule-based filtering of questions or electronic document portions to determine which questions or portions are required to complete an electronic form or topic. For these purposes, embodiments may utilize a specific data structure in the form of a decision table including rows defining respective rules and columns defining respective questions or electronic form portions. Rule or row elimination is based on the current electronic document data read from the shared data store, and the results of this completion analysis are utilized to identify selected questions or portions of a pre-defined electronic form or document, which are then provided to an interface controller to generate a customized interactive user interface for the customer that aggregates the selected question or portions identified by rule-based filtering.

Embodiments also provide for on the fly interactive user interface generation for presentation to a person that is not preparing an electronic document or utilizing an electronic document preparation application.

Embodiments are also related to how interactive user interface generation is triggered. An interface content engine may be triggered to execute in response to an electronic message or request submitted by a preparer of the electronic document through a first or preparer computing device. In another embodiment, an electronic message containing an application or link is transmitted by the preparer from the first or preparer computing device to a second or customer computing device such that the customer opens the electronic message and clicks the link or launches the application to initiate a request for questions to be answered by the preparer via a user interface to be generated for the customer. Thus, embodiments may involve direct or indirect triggering from the perspective of a preparer of the electronic document.

Embodiments are also related to automated population of electronic documents or forms thereof by use of multiple user interfaces, at least one of which is not defined by the electronic document preparation application is structured differently compared to user interfaces defined by the electronic document preparation application.

One embodiment involves a computer-implemented method for generating a customized user interface or interview screen and comprises a computer, by a processor executing computer-executable instructions of a first interface controller of an electronic document preparation application, accessing a template database that defines respective pre-defined and static structures of respective electronic documents or electronic document forms, input sheets or templates (generally, electronic form) utilized by the electronic document preparation application. Embodiments may involve a single electronic form utilized to generate the electronic document. The final product of the electronic document may include or be based on one or multiple electronic forms. For ease of explanation, reference is made to electronic forms that are completed to prepare an electronic document, one example of which is an electronic tax return that is prepared by an electronic document preparation application in the form of a computerized tax return preparation application and suing various electronic forms and worksheets.

Initially, a first user or preparer, such as an accountant, launces the electronic document preparation application and based on the preparer interaction, navigation or input, an electronic form is identified and presented to the first user through a first display of a first computing device by a first interface controller of the electronic document preparation application. First electronic data is received based on the first user's inputs and stored to a shared data store to update current electronic document data of the electronic document.

The computer executes an interface content engine and selects one or more pre-determined portions of one or more electronic forms of the electronic document preparation application for inclusion in a separate interview screen that is to be generated and presented to a second user different from the first user. For this purpose, the interface content engine may include, utilize or access (e.g., if a cloud-based resource) a rule-based completion engine. The completion engine may be a stand-alone component or a different version or component of a different version of the electronic document preparation application such that two different electronic document preparation applications are utilized according to embodiments. For example, a first user or preparer may be preparing an electronic tax return utilizing LACERTE tax return preparation application, and the interface content engine may leverage a rule-based completion engine that is a modular component of a different tax return preparation application of TURBOTAX tax return preparation application for analysis of which questions are to be answered in view of the current electronic tax return data. Thus, an electronic tax return may be prepared utilizing a first tax return preparation application, whereas a different tax return preparation application may be utilized for the limited purpose of determining which pre-determined portions of one or more electronic tax forms of the first tax return preparation application should be selected for the customized interview screen to be generated.

After selection of one or more pre-determined portions of one or more electronic forms of the electronic document preparation application, the interface content engine accesses the template database of or utilized by the electronic document preparation application and extracts, snips or copies the selected portions from one or more electronic forms defined by the electronic document preparation application. This extraction includes replicating certain content and functionality of the selected portion, e.g., copying a field that is to be populated together with an associated question or description of a question or data to be entered into the field. The computer then executes a second interface controller different from the first user interface controller of the electronic document preparation application. The second interface controller receives the extracted portions from the interface content engine and generates a new interview screen that is not defined by the electronic document preparation application and that aggregates the extracted portions. The generated interview screen is presented to a second user or customer different form the first user or preparer through a second display of a second computing device different from the first computing device. The second interface controller, through the generated interview screen, receives second electronic data from the second computing device based on the second user responses or input, and these responses are stored to the data store shared by the first and second interface controllers to update the current electronic document data in the shared data store. The first interface controller then reads the current electronic document data as updated by the second interface controller, corresponding fields of corresponding electronic forms are automatically populated based on the current electronic document data as updated by the second interface controller and presented to the first user through the first display. Thus, embodiments not only provide for a customized and more user friendly user interface that is automatically generated independently of a user interface that is pre-defined by an electronic document preparation application, but also provide for auto-population of electronic documents for which customized user interfaces are generated.

Another embodiment is directed to a computing system, which may be implemented as software, hardware, programmable logic such as Programmable Logic Devices (PLDs) or combinations thereof, for generating a customized interactive user interface or interview screen and automated population of electronic documents or forms. In one embodiment, the computing system includes one or more components of or utilized by an electronic document preparation application operable to prepare an electronic document including a first interface controller operable to generate a user interface, a template database in communication with the first interface controller and comprising pre-defined structures or configurations of electronic forms, input sheets or templates for user interfaces. The first interface controller is in communication with a data store including current electronic data of an electronic document being prepared. The first interface controller accesses the template database and the data store to populate the structure of an electronic form of the template database with current or runtime data read from the data store. According to embodiments, the template database and the data store are also in communication with an interface content engine, which is also in communication with a second interface controller and a completion engine. The completion engine is configured or operable to identify pre-determined portions or questions of an electronic tax form, input sheet or template, provide these results to the interface content engine, which is configured or operable to extract or copy corresponding functionality and content of pre-determined portions or segments of electronic forms in the template database, and then provide these extracted or copied portions to a second interface controller operable to aggregate the extracted portions into a new interview screen. The new interview screen is presentable to a second user different from the first user through a second display of a second computing device different from the first computing device and is not an interview screen defined by the electronic document preparation application.

Further embodiments are for articles of manufacture or computer program products comprising a non-transitory computer readable storage medium embodying one or more instructions executable by a processor of a computer to perform computer-implemented method embodiments.

Other embodiments are for computer generated user interfaces and structures of same.

One embodiment involves a computer-implemented method for generating a customized user interface or interview screen comprises a computer, by a processor executing computer-executable instructions of a first interface controller of an electronic document preparation application, accessing a template database that defines respective pre-defined and static structures of respective electronic documents or electronic document forms of or utilized by the electronic document preparation application. Embodiments may involve a single electronic document or multiple forms that are utilized to generate the electronic document. In other words, an electronic document may be generate using one or multiple electronic forms, input sheets or templates. For ease of explanation, reference is made to electronic forms that are completed to prepare an electronic document, one example of which is an electronic tax return that comprises various electronic forms and prepared using an electronic document preparation application in the form of a computerized tax return preparation application. An electronic form is identified during first user or preparer's use, navigation or interaction with the electronic document preparation application and presented to the first user through a first display of a first computing device by a first interface controller of the electronic document preparation application. First electronic data is received and stored to a shared data store to update current electronic document data of the electronic document. The computer executes an interface content engine and selects one or more pre-determined portions of one or more electronic forms of the electronic document preparation application for inclusion in a separate interview screen to be generated and presented to a second user different from the first user. For this purpose, the interface content engine may include, utilize or access (e.g., if a cloud-based resource) a rule-based completion engine, which may be a stand-alone component or a component of a different version of the electronic document preparation application. For example, a first user or preparer may be preparing an electronic tax return utilizing LACERTE tax return preparation application, and the interface content engine may leverage a rule-based completion engine that is a component of a different tax return preparation application of TURBOTAX tax return preparation application for analysis of which questions are to be answered in view of the current electronic tax return data. Thus, an electronic tax return may be prepared utilizing a first tax return preparation application, whereas a different tax return preparation application may be utilized to determine which pre-determined portions of one or more electronic tax forms of the first tax return preparation application should be selected.

After selection of one or more pre-determined portions of one or more electronic tax forms of the electronic document preparation application, the interface content engine accesses the template database of or utilized by the electronic document preparation application and extracts or "snips" the selected portions from one or more electronic forms. This extraction includes extraction of certain content and functionality, e.g., a field that is to be populated together with an associated question or description of a question or data to be entered into the field. The computer then executes a second interface controller different from the first user interface controller, which receives extracted portions from the interface content engine and generates an interview screen comprising the extracted portions that aggregates the extracted portions. The generated interview screen is presented to a second user through a second display of a second computing device different from the first computing device, and the second interface controller, through the generated interview screen, receives second electronic data from the second computing device based on the second user responses, which are stored to the shared data store to update the current electronic document data in the shared data store. The first interface controller then reads the current electronic document data as updated by the second interface controller and present one or more electronic forms populated with current electronic document data as updated by the second interface controller to the first user through the first display. Thus, embodiments not only provide for a customized user interface but also provide for auto-population of electronic documents for which customized user interfaces are generated.

In a single or multiple embodiments, the second user interface controller executes independently of the first interface controller. For example, the first user interface controller may be a component of the electronic document preparation application, whereas the second interface controller is separate and executes independently of the electronic document preparation application.

In a single or multiple embodiments, in the same electronic forms having the same respective pre-defined and static structures are presented to respective other users preparing respective other electronic documents through the first interface controller. In other words, the set of electronic forms is fixed or pre-determined, as are the content and structure thereof. The interview screen that is generated for the second user or customer includes a content and/or structural different compared to the electronic forms of the electronic document preparation application. One or more differences may include one or more or all of a different number of questions such that certain electronic form questions are omitted from the interview screen, a different arrangement, sequence or priority of selected questions, or the interview screen including a question of a second electronic form that is not included in a first electronic form.

In a single or multiple embodiments, the interview screen that is generated and presented to the second user or customer includes, or consists of, an extracted portion of a first electronic form and an extracted portion of a second electronic form different from the first electronic form that are aggregated together in the interview screen. The interview screen that is generated and presented to the second user may include, or consist of, a first extracted portion and a second extracted portion of a first electronic form, and a third extracted portion of a second electronic form different from the first electronic form, and these first, second and third extracted portions are aggregated together in the interview screen. Extracted portions may be received by the second interface controller without any indication of ordering, sequence or priority, and the second interface controller may execute priority rules to arrange the extracted portions in an order based on priority rule execution.

In a single or multiple embodiments, the interview screen is a single page including selected extracted portions of respective different electronic forms. A user can interact with the single page to scroll vertically or horizontally to view different extracted portions. In other words, it is not necessary to maintain the original pagination structure or divisions of the original electronic forms or original electronic form definitions due to aggregating extracted portions into the interview screen. With embodiments, the second user or customer can view all of the questions to be answered without having to navigate to different electronic forms or communicate back and forth with the first user or preparer and without having to view electronic forms in their original structure, which may involve various extraneous information.

In one or more embodiments, the interview screen presented to the second user comprises multiple questions, but a single question of a single electronic form may also be extracted for inclusion in the interview screen.

In a single or multiple embodiments, the generated interview screen is not provided to the first interface controller or presented to the preparer, and is not presented to other preparers of respective electronic documents utilizing the electronic document preparation application (e.g., an on-line tax return preparation application). Thus, embodiments can be utilized to generate respective customized interview screens for respective customers, and as customer data is provided to through respective interview screens, processing of which questions to ask or extract for generation of subsequent interview screens can be iteratively repeated, thereby providing for a focused, accurate and efficient way of determining electronic document data and automatically populating the electronic document or electronic form thereof, and reducing customer interactions with respective computing devices and communications with preparer computing devices.

In a single or multiple embodiments, the electronic document is an electronic tax return comprising a plurality of electronic forms, and the electronic document preparation application is a computerized tax return preparation application. Embodiments may also involve an electronic financial document comprising a plurality of financial or accounting forms, and the electronic document preparation application is a computerized accounting application.

In a single or multiple embodiments, the interface content engine is triggered to execute which pre-determined portions of which electronic forms or documents to extract based on a request transmitted by the first user or preparer computing device to the interface content engine. In other embodiments, the trigger involves both the first user or preparer computing device and the second user or customer computing device. For example, an electronic message is transmitted through a network from a first computing device of the preparer to a second computing device of the customer and includes a message from the preparer that the customer should click on a hyperlink to or application that is executed to access the second interface controller and request the questions to be answered. The second interface controller, in turn, triggers the interface content engine.

In a single or multiple embodiments, the interface content engine is located remotely relative to the first interface controller and the second interface controller, and in embodiments involving a separate rule-based completion engine, the rule-based completion engine may also be located remotely relative to the first interface controller, the second interface controller and the interface content engine, and may be a modular component of another computerized tax return preparation application that includes an interface to allow the computerized system to utilize the rule-based completion engine.

In a single or multiple embodiments, the interface content engine is in communication with the second interface controller but not the first interface controller, which is separate from these components.

In a single or multiple embodiments, tags, indicators, labels or metadata is used to identified pre-determined portions, and these tags are utilized by or communicated to other computing components such that the data eventually stored to the data store to update the current electronic document data is associated with the proper tag and thereby linked to a corresponding field of the electronic form for correct auto-population.

Tags or other metadata are included in the electronic forms, the shared data store and in the extracted portions included in the interview screen such that when the second user or customer enters data into the interview screen, the tag associated with the populated field thereof is also used as a reference when updating the shared data store, and that same reference is utilized by the first interface controller when reading the current electronic data from the shared data store to populate an input sheet, form or template to generate or populate the form or template. In a single or multiple embodiments, each extractable pre-determined portion includes a fillable field, a textual description associated with the fillable field, and a tag, label or metadata associated with the fillable field.

In one or more embodiments, the interface content engine determines one or more pre-determined portions to extract from an electronic form, input sheet or template by reading current electronic document data from the shared data store, which is provided to a rule-based completion engine. This is done independently of the template database and without having to access the database since a separate and independent rule-based completion engine is utilized by the interface content engine. In one embodiment, the computer, by executing the rule-based completion engine (or accessing the rule-based completion engine in the form of a networked or cloud resource), or Software As A Service (SAAS), applies the current electronic document data to a data structure to determine which questions or which pre-determined portions of one or more electronic forms to extract. According to one embodiment, the data structure includes a plurality of rows and a plurality of columns, wherein respective rules are defined by respective rows and respective questions are defined by respective columns, and respective rows are eliminated based on respective rules defined thereby and the current electronic document data to identify questions to be presented and associated electronic form portions associated with respective identified questions. There may be a data structure for each electronic form, input sheet or template. Respective pre-determined portions or questions of the data structure are associated with respective tags, and the interface content engine selects one or more tagged portions in the template database based at least in part upon tags associated with respective questions or columns in the data structure.

Thus, embodiments solve for limitations of known electronic document applications and computer generated user interfaces generated thereby, how information requests are communicated to customers and how customer provide responses to these requests that can be used for auto-population of the electronic document or form for which the requests were submitted, while reducing first and second user inputs and computer processing of same, electronic communications between a preparer and customer, and a more efficient computing system and method for presenting questions to be answered and auto-population of an electronic document. Embodiments utilize selective extraction of pre-defined or static electronic forms to generate a new user interface that is presented to a customer, thus transforming a pre-determined or fixed electronic form into an interactive interview experience for the second user or customer while addressing questions determined to be pertinent to the customer, thereby improving efficiency and accuracy of electronic form generation via a specifically structured user interface or interview screen and utilizing a non-generic arrangement of computing system elements.

BRIEF DESCRIPTION OF THE DRAWINGS

FIG. 7 illustrates an example of a data structure that can be utilize by completion engine and that define rules and questions or portions of a user interface or electronic form of and defined by the electronic document preparation application and having pre-defined and fixed content and structure to determine which user interface portions should be extracted and included in a customized, supplemental interview screen to be generated according to embodiments;

FIGS. 9A-B are examples user interfaces having pre-determined and fixed content and structure generated by an electronic document preparation application, and FIG. 9C is an example of a customized, interactive supplemental interview screen generated according to embodiments and that includes portions of user interfaces shown in FIGS. 9A-B that have been selectively extracted and aggregated;

DETAILED DESCRIPTION OF ILLUSTRATED EMBODIMENTS

Figure 1:
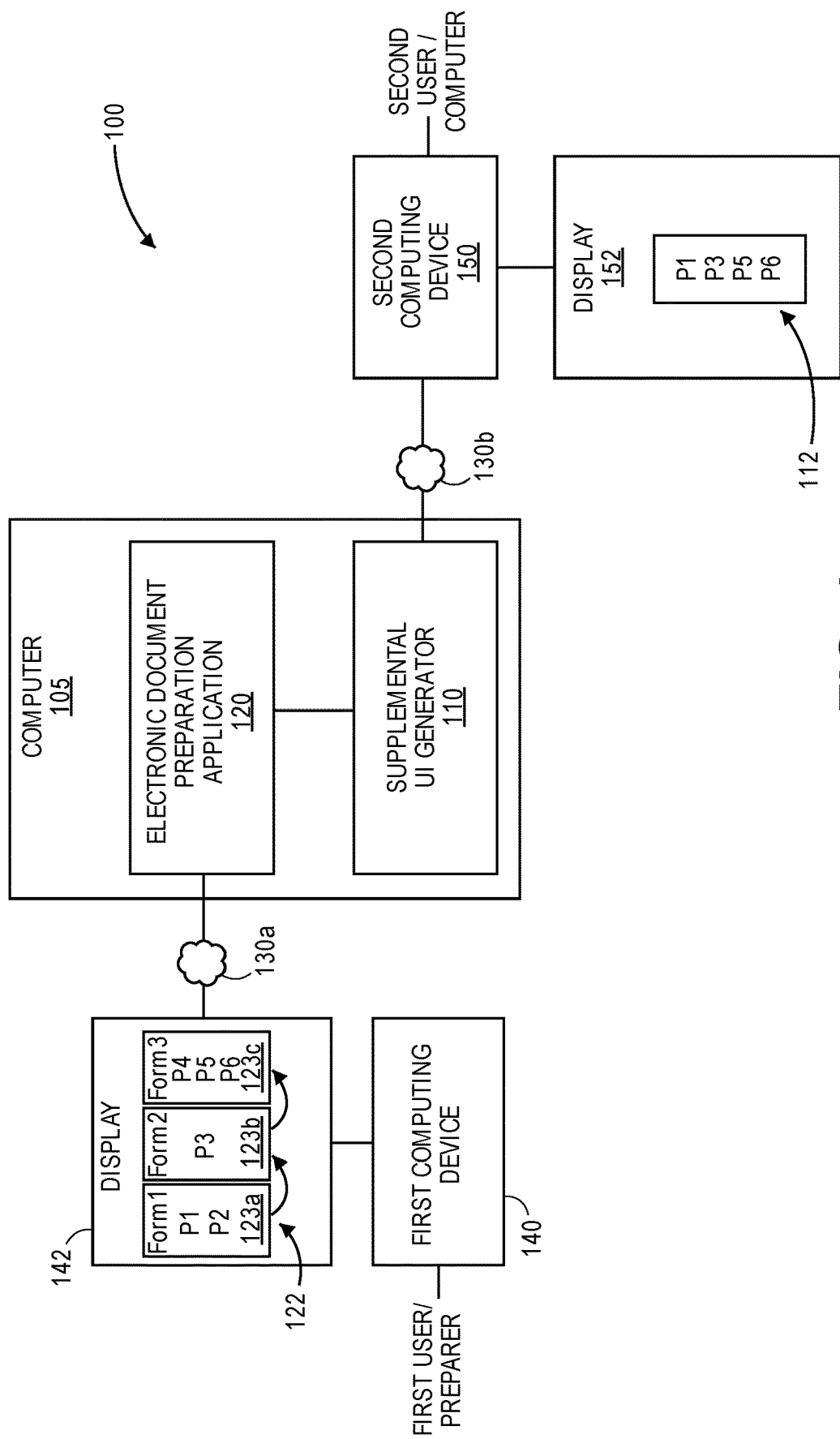
FIG. 1 depicts a networked computing system constructed according to one embodiment configured to generate a customized interview experience.

Embodiments of the present invention provide improvements to electronic document preparation applications, computer generated user interfaces, computer-based communications between a preparer of an electronic document and a customer for which the electronic document is being prepared, and automatic electronic document population, and provide for more efficient electronic data determination, communication and electronic document preparation.

With embodiments, rather than requiring a preparer to send one or more pre-defined electronic forms or input sheets of an electronic document preparation application that have pre-determined structure and content to a customer and request the customer to answer questions in these pre-defined electronic forms, embodiments of the invention selectively extract or copy the functionality and content of certain portions of one or more static, pre-defined electronic forms that are determined to be relevant to a customer. The selected portions are aggregated into a new, separate interactive interview screen that is presented to the customer rather than the original pre-defined electronic form or input sheet. In this manner, the customer is presented with selected, pertinent questions in a more user friendly interview format rather than having to navigate and decipher more detailed and complicated pre-defined and more complicated electronic forms, which may obscure what needs to be addressed as a result of extraneous and confusing content, which is exacerbated if preparer requests involve multiple electronic forms. Thus, embodiments transform a professional or "preparer experience" involving pre-determined or static user interfaces that present one electronic form of fixed content and structure at a time to the preparer into a more user friendly and efficient "interview experience" for a customer. These new interactive interview screens that can be generated on the fly during preparation of an electronic document by a preparer not only provide for a more efficient, pertinent and user-friendly experience but also reduce electronic communications between a preparer and a customer regarding questions to be answered since embodiments are able to generate an interview screen that aggregates questions to be answered from one or multiple electronic forms. Further, the responses to questions presented in the generated interview screen, which is not part of the electronic document generation application, can be circulated back to a database that stores electronic document data such respective answers can automatically flow into respective fields of respective electronic forms of the electronic document preparation, thus providing for improvements in electronic form preparation and further enhancing efficiency of electronic document preparation applications and preparation of electronic documents.

For example, embodiments may involve an electronic document preparation application in the form of a computerized tax return preparation application utilized by an accountant to prepare an electronic tax return for a taxpayer. For this purpose, the accountant may utilize an "input sheet" or pre-defined sheet or form based professional version of the computerized tax return preparation application such as LACERTE computerized tax return preparation application available from Intuit Inc. With embodiments, certain pre-determined portions (e.g., certain blank fields with respective descriptions or questions) of one or multiple pre-defined or static user interfaces or electronic forms are automatically identified and automatically selectively extracted, and a new interview screen that aggregates the extracted portions are presented to the taxpayer who then answers the questions, and these answers flow back into the electronic tax return being prepared by the accountant using the professional computerized tax return preparation application. Thus, questions of the professional computerized tax return preparation application are answered by the taxpayer without the taxpayer interacting with the professional computerized tax return preparation application and without being exposed to more involved and complicated and extraneous professional computerized tax return preparation application content. While the extraneous content may not be an issue for the preparer since the preparer is often a professional (such as an accountant, tax professional or attorney), the customer often does not have the same knowledge or experience as the preparer such that extraneous information provided can complicate responses to preparer questions. Various embodiments and aspects thereof are described in further detail with reference to FIGS. 1-11.

Referring to FIG. 1, a networked computing system 100 constructed according to one embodiment and configured to execute computer-implemented methods includes a customized, auxiliary or supplemental interactive user interface generator or interview experience generator 110 (generally, supplemental interface generator) that is utilized by or in communication with an electronic document preparation application 120. FIG. 1 illustrates supplemental interface generator 110 (UI generator) as a separate component relative to electronic document preparation application 120, but as described in this specification, supplemental interface generator 110 may share or access certain components of or utilized by electronic document preparation application 120. Further, supplemental interface generator 110 or certain components thereof may be modular components such as Software as a Service (SaaS) components. For ease of explanation, reference is made to a computer 105 executing electronic document preparation application 120 and supplemental interface generator 110. In the illustrated embodiment, electronic document preparation application 120 is in communication through network 130a with a first computing device 140 of a first user or preparer of an electronic document, and supplemental interface generator 110 is in communication through network 130b with a second computing device 150 of a second user or customer for which the electronic document is being prepared by the first user.

FIG. 1 generally illustrates user interfaces 122a-c (generally, user interface 122) generated by electronic document preparation application 120 including pre-defined electronic forms, input sheets or templates 123a-c (generally, electronic form 123) presented to preparer in a serial manner (represented by arrows). Thus, a preparer views a first electronic form 123a having a pre-determined or static structure or content, manipulates an input element of first computing device 140 to view a second electronic form 123b having a pre-determined or static structure and content, and so on. Pre-determined or static structure or content refers to the structure and content defined or specified by electronic document preparation application form, input sheet or template 123 itself in contrast to content or data entered into or that populates the electronic form, input sheet or template 123.

Figure 2:
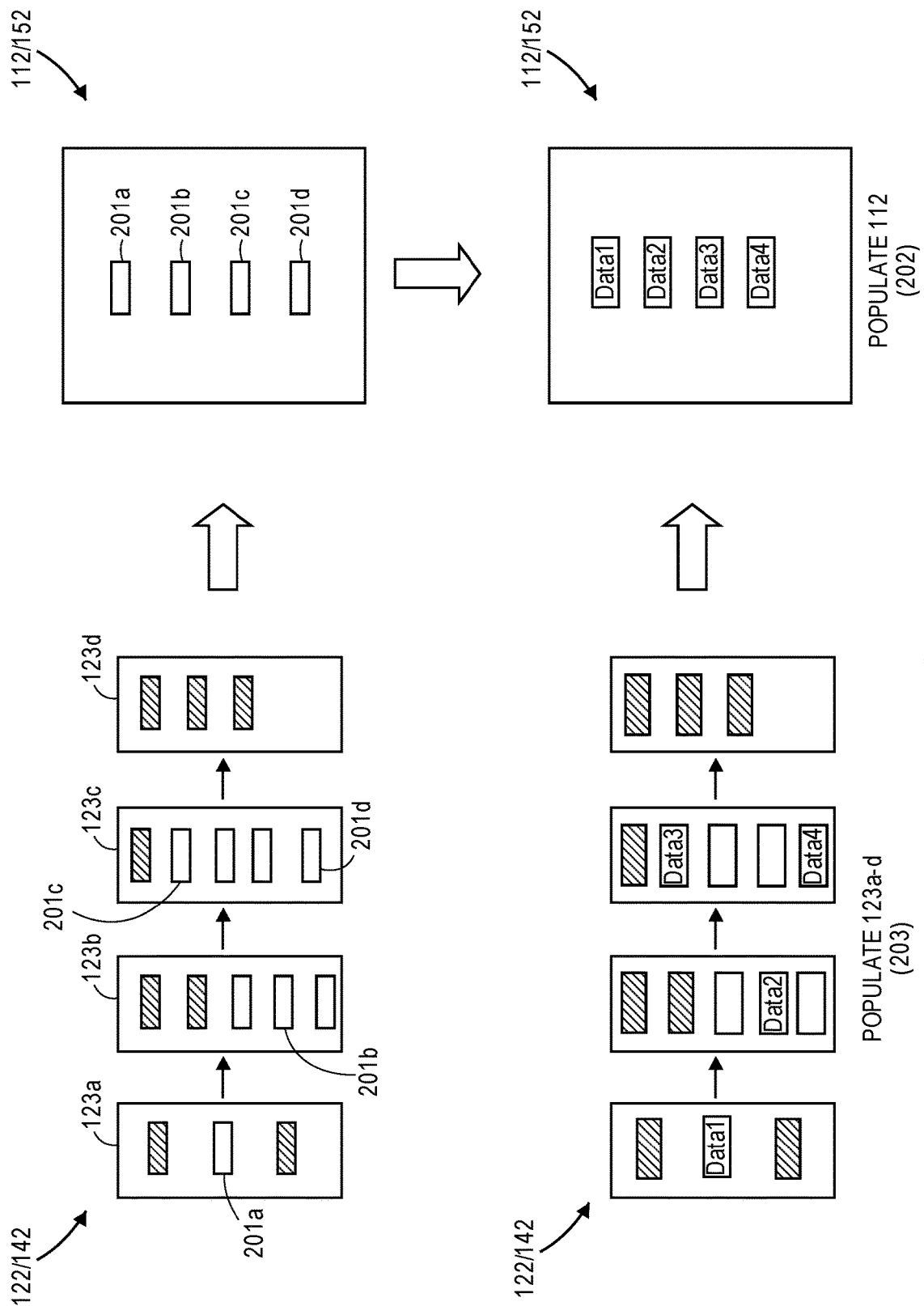
FIG. 2 depicts how user interfaces generated by an electronic document preparation application having a pre-determined and fixed content and structure and presented to a document preparer are selectively transformed into a customized, interactive supplemental interview screen having different structure and content and that is presented to a customer for whom the electronic document is being prepared.

Referring to FIG. 2, with embodiments of the invention, supplemental interface generator 110 transforms how certain questions, fields or portions 201a-d (generally, portions 201) of electronic document preparation application's electronic forms 123 are presented to customer when preparer is requesting customer to provide input for electronic document being prepared. Portions 201 of rigid and static electronic form 123 structure defined by electronic document preparation application 120 are selectively copied and aggregated to generate a more user-friendly, ad hoc, composite, supplemental interview screen 112. Supplemental interview screen 112 includes selected portions 201 while allowing customer to interactive with supplemental interview screen 112 independently of electronic document preparation application 120. Supplemental interview screen 112 integrates selected portions 201 of multiple electronic forms 123 without pre-defined segmentation or pagination of original electronic forms 123a-d. Thus, while pre-defined and static electronic forms or input sheets 123a-d may be utilized by preparer and other users of electronic document preparation application 120, supplemental interview screen 112 is not pre-defined and is generated on the fly for a particular customer for which the electronic document is being prepared. FIG. 2 further illustrates that as the customer enters data 202 to populate fields of respective portions 201 and respond to selected questions, this new or updated data automatically flows back 203 into electronic document preparation application 220 to automatically populate and update the electronic document that was the subject of the supplemental interview screen 112 generation.

Embodiments may utilize or involve various types of electronic document preparation applications 120, and certain embodiments utilize or involve a computerized tax return preparation application utilized by a preparer/accountant to prepare an electronic tax return for a customer/taxpayer. Thus, computerized tax return preparation applications and computerized financial document preparation applications are non-limiting examples of electronic document preparation applications 120 that may execute, utilize or include embodiments, and for ease of explanation, embodiments are described with reference to examples involving computerized tax return preparation applications, preparation of an electronic tax return by a first user, preparer or accountant (generally, accountant), on behalf of a second user, customer or taxpayer (generally, taxpayer). Reference is made to an example in which an accountant is preparing an electronic tax return using a "professional" version of a computerized tax return preparation application, or product or version most commonly utilized by accountants or tax professionals rather than consumers. One example of a "professional" computerized tax return preparation application commonly used by accountants and tax professionals is LACERTE computerized tax return preparation application available from Intuit Inc. LACERTE is a registered trademark of Intuit Inc., Mountain View, Calif. It will be understood by persons skilled in the art that embodiments may utilize or involve other computerized tax return preparation applications, and that LACERTE computerized tax return preparation application is provided as one, non-limiting example. Thus, reference is made to an electronic document preparation application 120 generally, and particular examples involving computerized tax return preparation applications.

Figure 3:
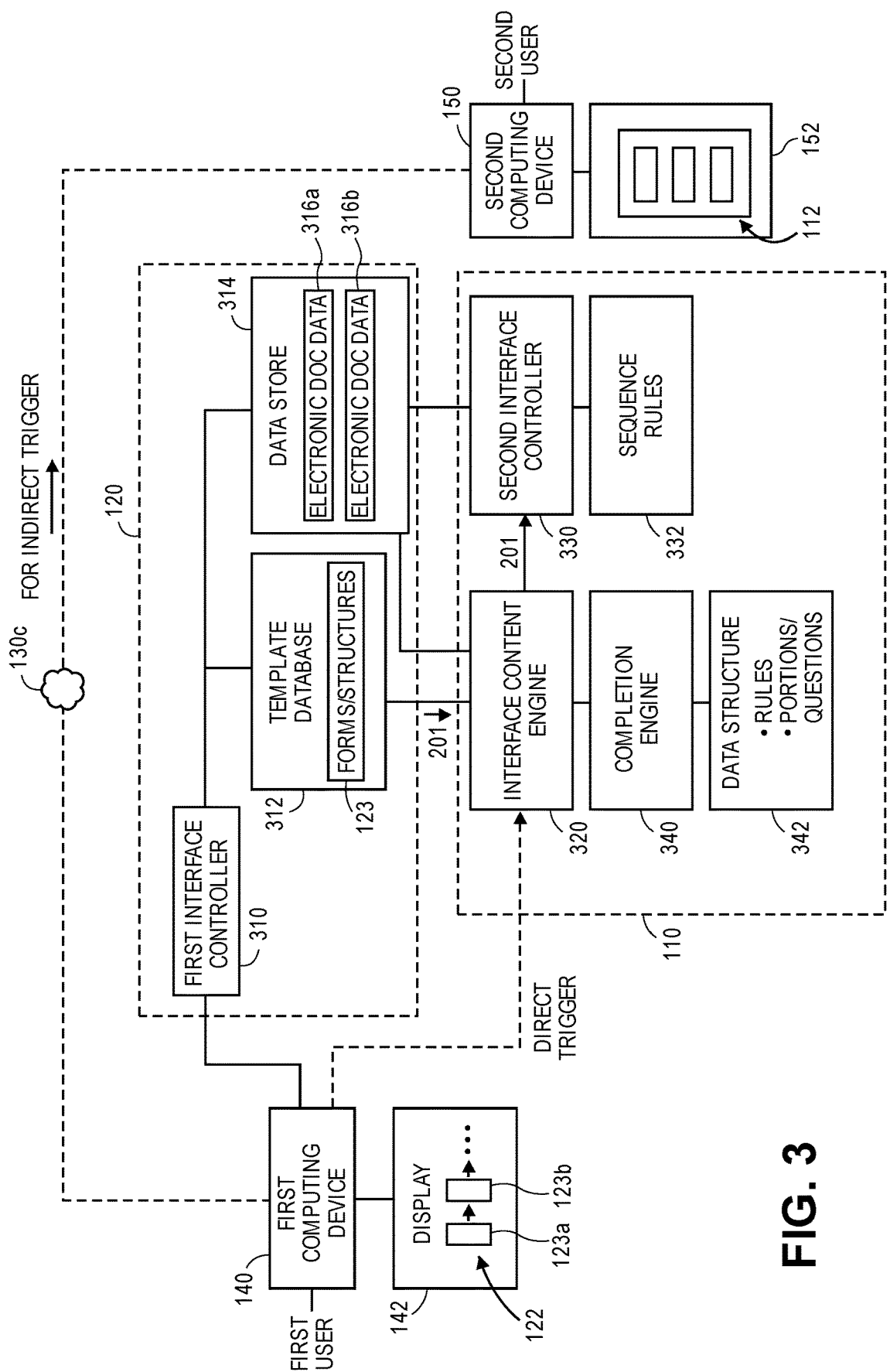
FIG. 3 depicts a computing system constructed according to one embodiment for generating a customized, interactive supplemental interview screen.

Referring to FIG. 3, a computing system 300 constructed according to one embodiment includes non-generic components and non-generic arrangement of components for automated, on-the-fly generation of a customized supplemental interview screen 112 that is not a programmed user interface of electronic document preparation application 120, and subsequent automated population of pre-defined and static electronic form, input sheets or templates 123 (generally, electronic form 123) of electronic document preparation application 120 based on input or responses provided by the customer through supplemental interview screen 112.

In the illustrated embodiment, electronic document preparation application 120 includes a user interface controller, also referred to as first interface controller 310, which generates a user interface 122 including electronic forms 123 defined by electronic document preparation application 120 and presented through display 142 of preparer's computing device 140. For this purpose, first interface controller 310 is in communication with an electronic form, input sheet or template database (generally, template database 312) and a data store 314 including current electronic document data for various customers 316a-b (generally, current electronic document data 316). An electronic form 123 includes a pre-defined field structure and respective associated pre-defined field descriptions or questions specified or defined by electronic document preparation application 120. During execution, first interface controller 310 reads current electronic document data 316 from data store 314, retrieves one or more corresponding electronic forms 120 and populates respective electronic forms 123 with respective electronic data 316.

In embodiments involving electronic document preparation application 120 in the form of a computerized tax return preparation application, data 316 stored in data store 314 may be in Modernized E-Filing (MeF) format. MeF is a web-based system that allows electronic filing of corporate, individual, partnership, exempt organization and excise tax returns through the Internet. MeF uses Extensible Markup Language (XML) format and is used when identifying, storing and transmitting data. Other schemas for data formats may be utilized depending on the type of electronic document preparation application 120 and functions thereof.

With continuing reference to FIG. 3, one embodiment of supplemental interface generator or interview experience generator 110 in communication with or utilized with the electronic document preparation application 120 as shown in FIG. 3, includes an interface content engine 320 in communication with template database 312 and data store 314 of or utilized by electronic document preparation application 120, and in communication with an independent, second interface controller 330 and a completion engine 340. Second interface controller 330 executes independently of first interface controller 310 and is in communication with interface content engine 320 to receive extracted pre-determined portions 201 of electronic forms 123 identified by completion engine 340 and retrieved from template database 312 by interface content engine 320. Second interface controller 330 constructs the new, composite or supplemental interview screen 112 by aggregating extracted or copied pre-defined portions 201 together, e.g., within a pagination-free, scrollable single screen 112, to provide a more user friendly and more focused interview experience rather than a static and pre-determined form or template 123 with extraneous information that is not necessary, which also reduces the possibility that the customer enters incorrect data, data into incorrect fields, or data into fields that are not required or requested. Upon receiving user input through supplemental interview screen 112 generated by second interface controller 330, second interface controller 330 updates current electronic document data 316 in shared data store 314, which is accessed by first interface controller 310. First interface controller 310 of electronic document preparation application 120 then presents user interface 122 reflecting updated electronic document data 316. Further aspect of FIG. 3 and one manner in which a computer-implemented method may be executed utilizing the system 300 configuration illustrated in FIG. 3 are described with reference to FIGS. 4-11.

Figure 4:
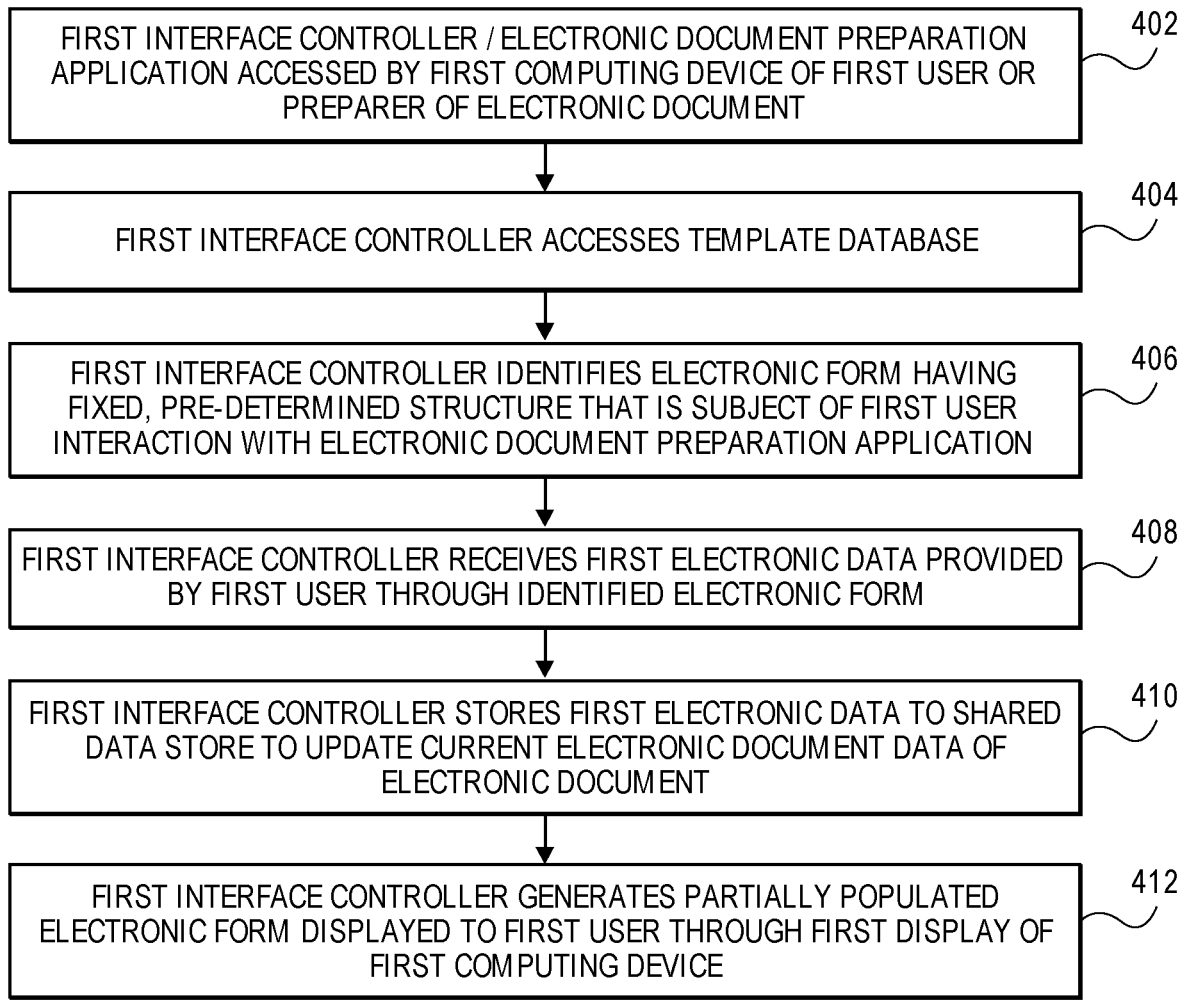
FIG. 4 is a flow diagram of an algorithm for a computer-implemented method executed by a first interface controller of an electronic document preparation application.

Referring to FIG. 4, as an initial context, at 402, first user or preparer is interacting with first computing device 140 and navigating or providing inputs via user interface 122 generated by first interface controller 310 of electronic document preparation application 120, and in response, at 404, first interface controller 310 accesses template database 312. At 406, first interface controller 310 identifies a pre-defined and static electronic form 123 having a fixed, pre-determined structure that is subject of first user's interaction or request, and at 408, receives first electronic data provided by first user through identified electronic form presented via user interface 122. At 410, first interface controller 310 writes the resulting electronic data to shared data store 314 to update current electronic document data 316 of electronic document or to write initial electronic document data 316 to shared data store 314. At 412, first interface controller 310 generates partially populated electronic form that is displayed to first user through first display 142 of first computing device 140. At this juncture, preparer may determine that electronic document is incomplete and customer input is required for various missing information or clarification, and embodiments are executed to identify which questions are to be addressed by the customer, generate supplemental interview screen 112 according to embodiments, and at least partially auto-populate additional fields of electronic document or forms 123 based on customer responses submitted through supplemental interview screen 112.

Figure 5:
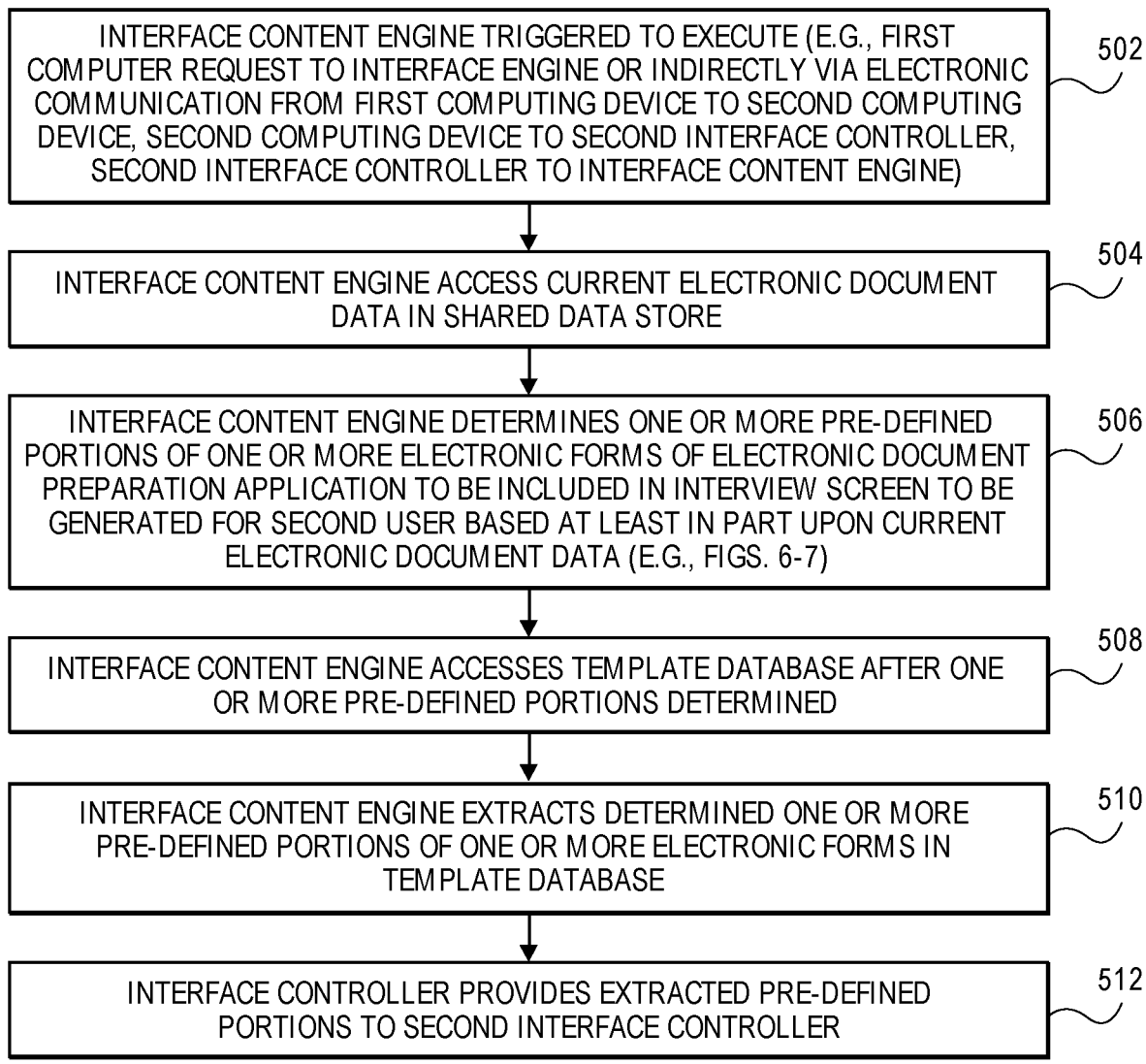
FIG. 5 is a flow diagram of an algorithm for a computer-implemented method executed by an interface content engine that generates a customized, interactive supplemental interview screen for a customer for whom an electronic document is being prepared.

Referring to FIG. 5, at 502, interface content engine 320 is triggered to execute and initiate the process for determining which questions are to be presented to the customer through supplemental interview screen 112 to be generated.

Triggering embodiment execution may involve first computing device 140 or both the first computing device 140 and second computing device 150.

For example, referring again to FIG. 3, first computing device 140 of preparer and second computing device 150 of customer may be in communication with each through one or more networks 130c. During use of electronic document preparation application 120, preparer may reach a point in the preparation process requiring customer input or answers. Preparer generates an electronic message including a hyperlink or executable program using first computing device 140 or other computing device, and the electronic message is transmitted through network 130c to second computing device 150 of customer. The electronic message is opened and displayed, and customer clicks on the hyperlink or executes the program included in or attached to the electronic message, and second computing device 150 establishes a connection with second interface controller 330 and submits a request to second interface controller 330 for questions that are to be answered by customer for preparer. Various communication systems and methods may be utilized for electronic message transmission to second computing device 150 including, e-mail, SMS, and communications via an intermediate online portal and communication and document management system such as LINK online portal, available from Intuit Inc. However, preparer is not required to provide the list of questions in the electronic message, i.e., is not required to provide the list of questions beforehand to the customer or to be included in supplemental interview screen 112. Instead, with embodiments, an electronic message is transmitted from first computing device 140 to second computing device 150, and embodiment execution may be initiated by use of the linked website or executed application.

Thus, execution of embodiments may be triggered "indirectly" by preparer and customer action or request via communication from first computing device 140 to second computing device 150, from second computing device 150 to second interface controller 330, then from second interface controller 330 to interface content engine 320, or from second computing device 150 to interface content engine 320 to trigger execution of interface content engine 320. In another embodiment, preparer can trigger execution of embodiments by submitting a request directly to the interface content engine 320. For these purposes, an application or program that is separate from the electronic document preparation application 120 may be executed by the first computing device 140 to directly or indirectly submit a trigger request to the content interface engine 320. In other embodiments, execution of embodiments may be triggered "directly" by preparer, and for this purpose, first computing device 140 may submit request to interface content engine 320 directly, or electronic document preparation application 120 may can include a menu item or user interface element that can be selected by preparer to initiate embodiments by a request submitted through electronic document preparation application 120. In other embodiments, interface content engine 320 is configured to be automatically activated, e.g., periodically, without a request transmitted by first computing device 140 or second computing device 150, which services to ensure that preparation of the electronic document is progressing and the electronic document data 316 in data store 314 is being periodically updated for a more current and accurate electronic document.

Accordingly, it will be understood that embodiments may trigger execution of embodiments to determine which questions to ask the customer (without the preparer having to specify the questions), and that such requests by the preparer may be made through electronic document preparation application 120 or independently of electronic document preparation application 120.

Referring again to FIG. 5, at 504, interface content engine 320 accesses shared data store 314 to read current electronic document data 316, e.g., based on previously data entry or preparation by preparer using first computing device 340 as described with reference to FIG. 4, or based on prior iterations of embodiment processing and automatic updates to current electronic document data 316 as described in further detail below.

At 506, based on current electronic document data 316, interface content engine 320 determines which pre-defined portions 201 of one or more electronic forms or input sheets 123 in template database 312 of electronic document preparation application 120 should be selected or copied for inclusion in supplemental interview screen 112 to be generated. With embodiments, this determination is made without requiring preparer to specify which questions of portions 201 of one or more electronic forms 123 are required to be answered. Instead, according to one embodiment, interface content engine 320 utilizes completion engine 340 that analyzes which topics or portions 201 of electronic forms 123 are to be addressed in view of what has already been completed or what is already reflected in current electronic document data 316, or in other words, which portions 201 are incomplete and need to be answered in order to reach a status of completion for the electronic document.

One embodiment of completion engine 320 is a rule-based decision engine, and according to one embodiments, rule-based decision engine is a component or module of a different electronic document preparation application. This module may be a component of or utilized by interface content engine 320 as generally illustrated in FIG. 3, and may be Software as a Service (SaaS) accessible by interface content engine 320 through a network. For example, in embodiments involving preparation of electronic tax returns, first user, preparer or accountant may utilize a first tax return preparation application such as LACERTE tax return preparation application, whereas the rule-based decision engine 340 is a component of a different second tax return preparation application such as TURBO TAX return preparation application. Thus, in these embodiments, the first tax return preparation application is utilized by the first user or preparer to prepare an electronic document, whereas a different, second tax return preparation application or SaaS 340 is utilized by interface content engine 320, and not first user or preparer, to determine which portions 201 of electronic forms 123 or input sheets defined by first tax return preparation application should be selected for inclusion in supplemental interview screen 112 that is not defined by the first tax return preparation application.

Figure 6:
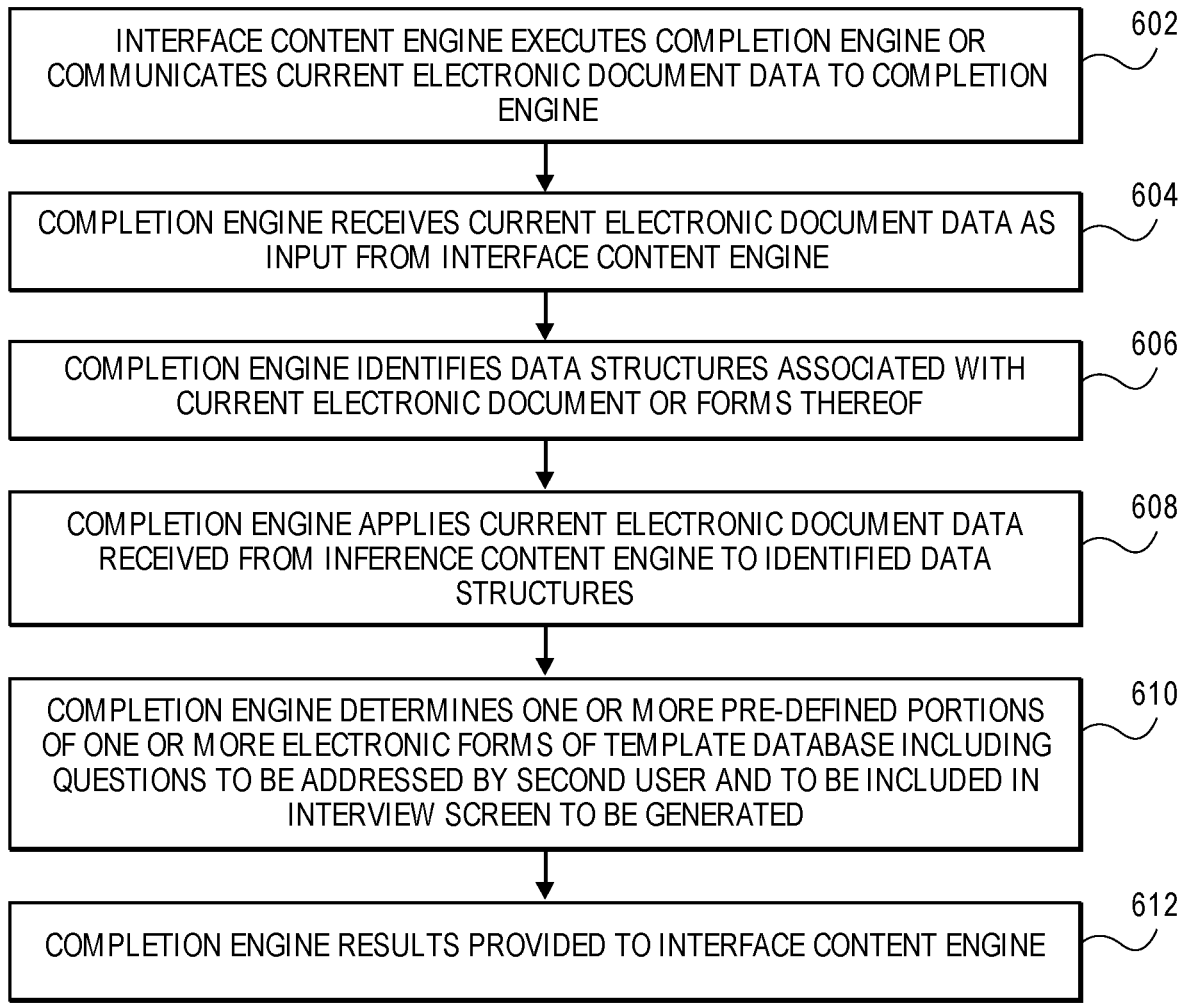
FIG. 6 is a flow diagram of an algorithm for a computer-implemented method executed by completion engine that identifies certain pre-determined portions of one or more user interfaces having pre-determined and fixed content and structure.

For example, referring to FIG. 6, at 602, interface content engine 320 executes or accesses completion engine 340 and communicates current electronic document data 316 to completion engine 340. At 604, the completion engine 340 receives current electronic document data 316 as an input from interface content engine 320, and at 606, and as shown in FIG. 3, completion engine 340 identifies data structures 342 associated with the electronic document being prepared or electronic forms 123 or input sheets thereof. At 608, completion engine 340 applies current electronic document data 316 to identified data structures 342, and at 610, determines one or more pre-defined portions or segments 201 of one or more electronic forms or input sheets 123 that include questions to be addressed by the customer or second user. The results of determined pre-defined portions or segments 201 as determined with reference to data structure 342 are provided to interface content engine 320 for further processing FIG. 7 illustrates one example of a data structure 342 and how the data structure 342 may be generated for use by completion engine 340 in order to identify certain pre-defined portions or segments 201 of one or more electronic forms or input sheets 123 having questions that are to be answered by customer.

In the illustrated embodiment, current electronic form data 316 is applied to data structure 342 in the form of decision table including rows 701 defining respective rules and columns 702 defining respective pre-determined portions or segments 201 of electronic forms or input sheets 123 of electronic document preparation application 120. As an example, given current electronic document data 216, if it is known that fields for pre-determined portions 201 have already been populated with an answer to Question A (Y or true), then rules involving a "N" answer to Question A, or that the portion 201 has not been populated), are not applicable, and those rows of the decision table 460 including a "N" answer to portion or Question A (i.e., the bottom three rows in the illustrated example) can be crossed out or eliminated form further consideration by completion engine 340. This leaves two rows or rules in the illustrated example. Since respective portions 201 including questions B, D and E are "don't care" or "not relevant" (?) and the portion 201 including a field populated with an answer to Question A is already known, the remaining questions 461 and associated pre-defined portions or segments 201 of one or more electronic forms or input sheets 123 that require answers based on the current runtime data 316 include Questions C and G of associated pre-determined portions 201. Thus, according to one embodiment, the rule-based completion engine 340 uses the decision table 700 to select one or more rules and determine or select a question to be answered, or associated pre-defined portion or segment 201 including field to be populated, in view of current electronic document data 316. Of course, it will be understood that such a completion analysis may involve one or more decision tables, a decision table may be defined for each electronic form 123, and each decision table may include a significantly large number of rows and columns such that FIG. 7 is provided as a simplified example for purposes of explanation. Further aspects of such decision table generation and processing in the context of identifying questions for presentation to a preparer of an electronic tax return, which can be applied to identify which associated pre-defined portions or segments 201 of electronic forms or input sheets 123 associated with such questions or answers yet to be provided are described in U.S. Pat. No. 9,760,953, the contents of which are incorporated herein by reference. It will be understood that use of decision table 700 with rows 701 defining rules and columns 701 defining pre-defined portions or segments 201 of electronic forms or input sheets 123 is one way in which pre-defined portions or segments 201 can be identified for extraction or selective copying a portion 201 of an electronic form or input sheet 123, i.e., copying a field to be populated, associated question or text description and associated software code for implementing presentation of the text description or question and population of the field).

Referring again to FIG. 5, at 408, interface content engine 320 accesses template database 312 of electronic document preparation application 120, and at 410, selectively extracts or copies the one or more pre-defined portions 201 of one or more electronic forms or input sheets 123 including questions to be answered by the customer as identified by completion engine 340. At 412, these pre-defined portions or segments 201 are provided by interface content engine 320 to second interface controller 330.

Figure 8:
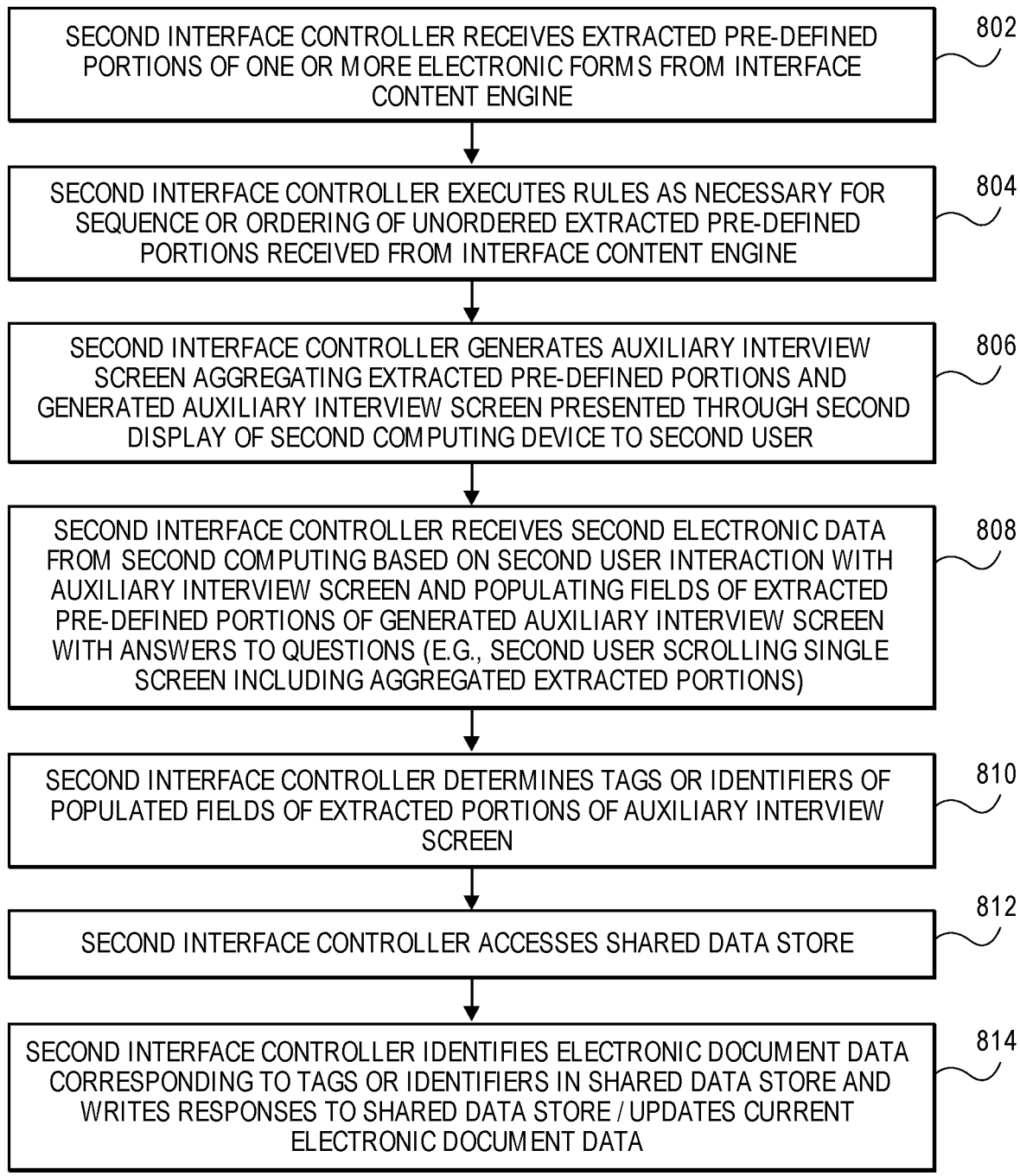
FIG. 8 is a flow diagram of an algorithm for a computer-implemented method executed by a second interface controller that is independent of the first interface controller of the electronic document preparation application and that processes results generated by the content interface engine.

Referring to FIG. 8, at 802, second interface controller 330 receives extracted pre-defined portions 201 of one or more electronic forms or input sheets 123, which include a description or question and corresponding field that can eventually be populated with electronic data via supplemental interview screen 112 to be generated. At 804, and referring again to FIG. 3, second interface controller 330 may execute rules 332 as necessary for sequence or ordering of unordered extracted pre-defined portions 201 received from interface content engine 320. Sequencing rules 332 may be utilized due to completion engine 340, in embodiments involving decision table 700, identifying pre-defined segments or portions 201 without reference to any sequence or order. Sequencing rules 332 may, for example, specify that identified pre-defined segments or portions 201 of the same electronic form or input sheet 123 be grouped together, or that portions 201 of one electronic form 123 be presented ahead of portions 201 of a different electronic form 123.

Continuing with reference to FIGS. 3 and 8, at 806, second interface controller 330 generates customized supplemental interview screen 112 that aggregates extracted pre-defined portions 201 and that is presented through second display 152 of second computing device 150 to second user. The structure, content and interaction functionality of the generated supplemental interview screen 112 are different compared to the structure, content and interaction functionality of the original electronic document or input sheet(s) 123 as a result of aggregating only selected portions 201 and filtering out extraneous form 123 content to provide a more user friendly, interview-type interactive experience for the customer. According to one embodiment, the supplemental interview screen 112 is structured as a single screen in which aggregated portions 291 are accessible by scrolling through the single screen without the pre-defined structure and pagination of the original electronic forms or input sheets 123 defined by the electronic document preparation application 120.

Figure 9A:
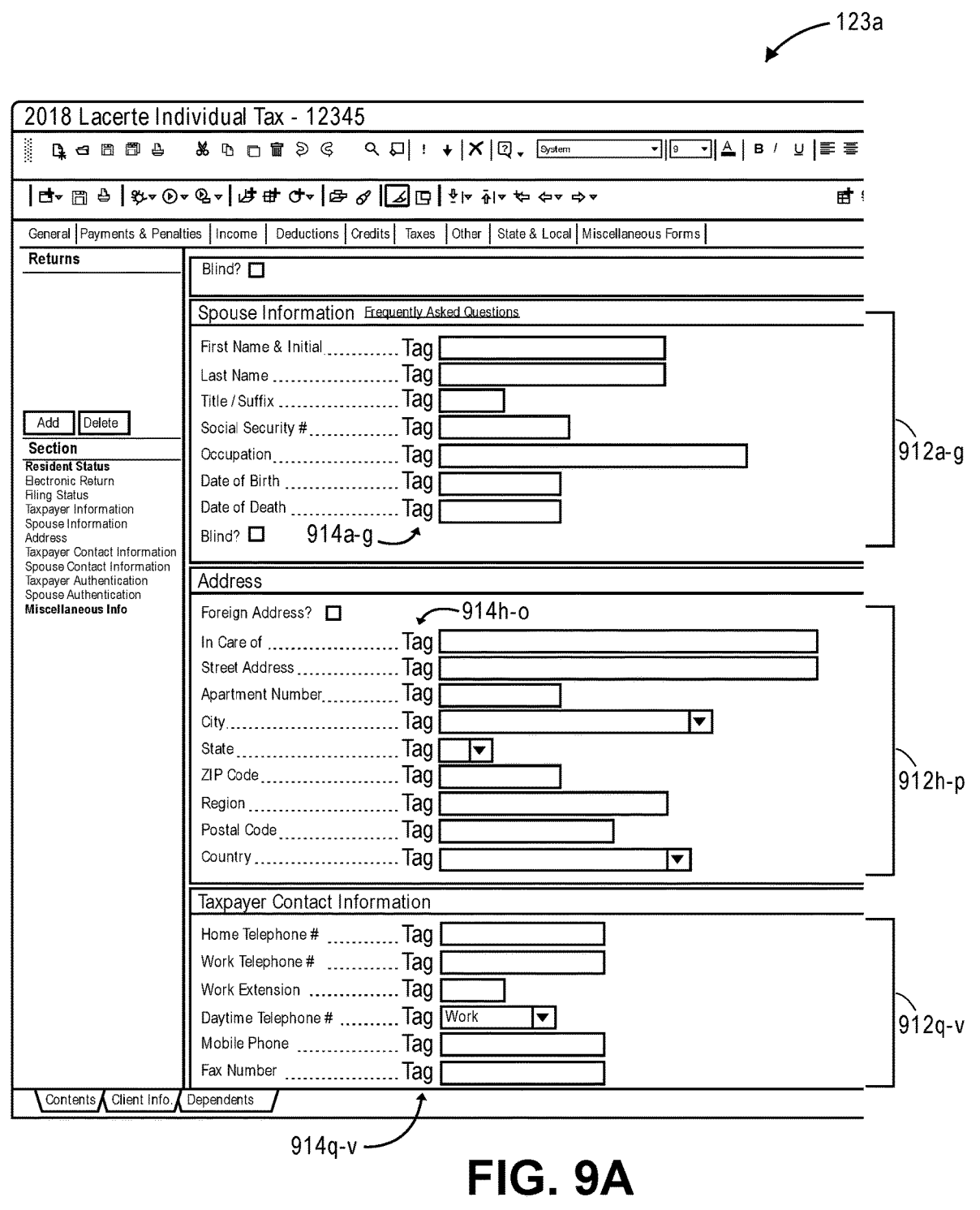
Figure 9B:
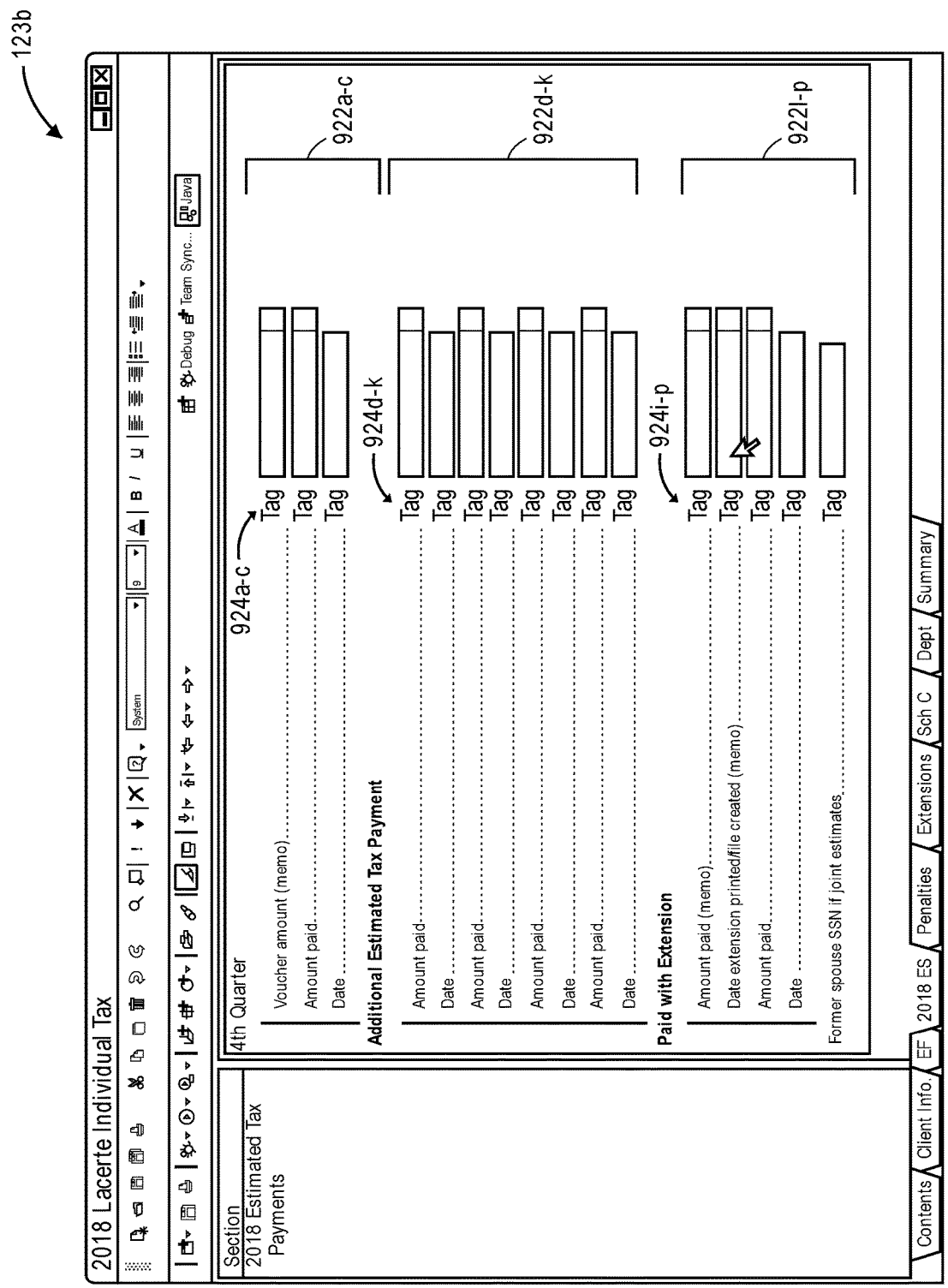

For example, FIG. 9A illustrates one electronic form or input sheet 123a including pre-defined fields or portions 912a-v and associated tags or metadata 914a-v. Pre-defined fields or portions 912d and 912q-v (including text descriptions, fields to be populated) were identified by interface content engine 320 for selective extraction. FIG. 9B illustrates another electronic form or input sheet 123b including pre-defined fields or portions 922a-p and associated tags 924a-p. Fields and field descriptions or questions are presented to the customer, but tags or metadata are not. Pre-defined fields or portions 922a-c and 9220-p were identified for selective extraction.

FIG. 9C illustrates a resulting supplemental interview screen 112 generated according to embodiments and presented by second interface controller 330 in which selected portions 912d, 912q-v, 922a-c and 922n-o, as well as 932a-b (associated with tags 934a-b) from another input sheet (not illustrated, e.g., involving business income-expenses) are aggregated together and structured as a single, scrollable, interactive supplemental interview screen 112. Thus, as shown in FIG. 9C, the particular portions 201 (912, 922, 932) determined to be pertinent to the customer and that are yet to be completed are identified in the generated supplemental interview screen 112, thereby filtering out other unnecessary fields (even if not yet populated) and streamlining the interface structure, user interactions relevant fields or selected sections of electronic forms or input sheets, while also reducing extraneous information and providing for more efficient and accurate data entry and processing since the customer is less likely to be confused by other fields or sections that may not be required.

According to one embodiment, supplemental interview screen 112 is different compared to content and structure of each electronic form or input sheet 123 defined by electronic document preparation application 120 by having a different number of questions than the electronic form or input sheet 123 and/or collection of electronic forms or input sheets 123 analyzed. For example, FIG. 9C illustrates supplemental interview screen 112 including 14 fields to be populated based on pre-defined portions extracted from multiple electronic forms 123 with different numbers of questions and fields and different pre-defined structures. Supplemental interview screen 112 may also be different compared to content and structure of an electronic form or input sheet 123 as a result of including a different arrangement of questions, sequencing of questions, or sequencing of groups of questions compared to an electronic form or input sheet 123. As another example, the various questions or fields, including unpopulated fields, of pre-defined electronic form or input sheet 123 may be excluded from supplemental interview screen 112 since an unpopulated field of an input sheet 123 may be considered by completion engine 230 to not be relevant to current electronic document data 316 in shared data store 314. As a further example, supplemental interview screen 112 is different compared to content and structure of a first electronic form 123a by including at least one question of a different, second electronic form 123b, a different third electronic form 123c, and other electronic forms and portions thereof.

With continuing reference to FIGS. 3 and 8, at 808, second interface controller 330 receives second electronic data from second computing device 350 based on second user interaction with and populating fields of extracted portions 201 included in supplemental interview screen 112 with responses to presented questions, and at 810, second interface controller 330 determines tags, identifiers or metadata 920 (as generally illustrated in FIGS. 9A-C) associated with the fields of extracted portions 201 of supplemental interview screen 112. FIGS. 9A-B illustrate fields being tagged with labels or metadata (914a-v, 924a-p and 934a-b) (generally, tag 914). At 812, second interface controller 330 accesses shared data store 314, and at 814, identifies electronic document data or fields or schema instances associated with respective tags 914 or metadata and writes the customer's responses that were provided in corresponding tagged fields of supplemental interview screen 112 to corresponding fields or instances of shared data store 314, thereby updating current electronic document data 316.

Figure 10:
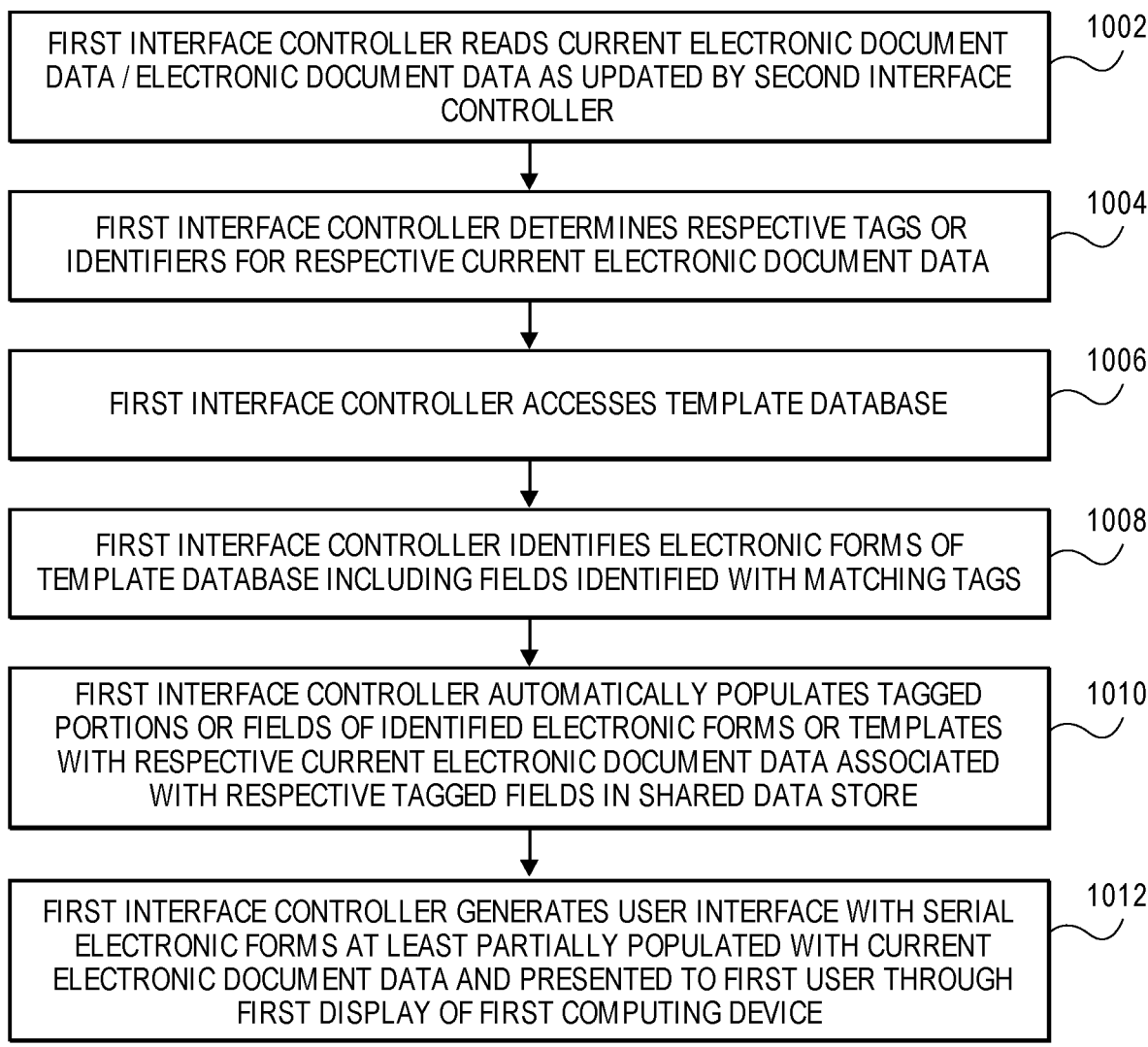
FIG. 10 is a flow diagram of an algorithm for a computer-implemented method executed by the first interface controller after the customized interview screen has been generated and the customer has provided responses to questions presented in the customized interview screen.

Referring to FIG. 10, and with continuing reference to FIG. 3, at 1002, first interface controller 310 reads current electronic document data 316 as updated by second interface controller 330, and at 1004, determines respective tags 914 thereof. At 1006, first interface controller 310 accesses template database 312, and at 1008, identifies electronic forms 321 including fields associated with tags 914 of the current electronic document data 316, and at 1010, automatically populates tagged portions or fields of identified electronic forms or templates 123 with respective current electronic document data 316 associated with respective tagged fields in shared data store 314. At 1012, first interface controller 3120 generates an updated user interface 122 including at least partially populated electronic forms 123 populated based on current electronic document data 316 as updated by second interface controller 330, and updated user interface 122 is presented to first user through first display 142 of first computing device 140.

Thus, when a certain pre-defined portion 201 is extracted, tags 920 or metadata associate with the portion 201 or field thereof are carried into the interview screen 112 that is generated, such that when the customer provides answers to the questions in a tagged field, the same tag or metadata is utilized when storing the answers to the shared data store 314, and the same tag or metadata is utilized when reading the current electronic data 316 to populate a pre-defined electronic form or input sheet 123 defined by the electronic document preparation application 120.

Figure 11:
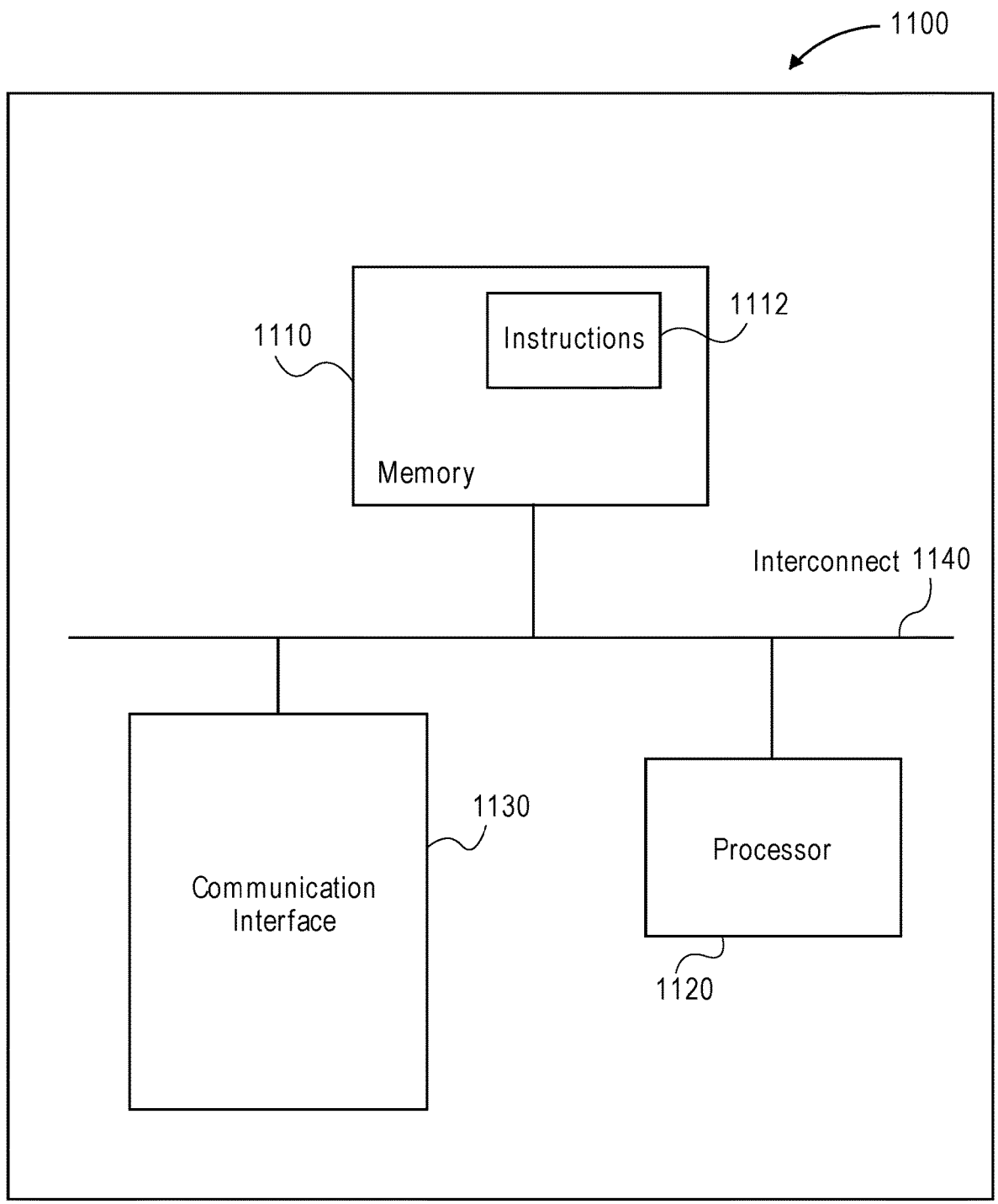
FIG. 11 illustrates generally the components of a computing device that may be utilized to execute embodiments for generating a customized, interactive supplemental interview screen and to automatically populate an electronic form based on responses submitted through the customized, supplemental interactive supplemental interview screen.

FIG. 11 generally illustrates components of a computing device 1100 that may be utilized to execute embodiments and that includes a memory 1110, account processing program instructions 1112, a processor or controller 1120 to execute instructions 1112, a network or communications interface 1130, e.g., for communications with a network or interconnect 1140 between such components. The memory 1110 may be or include one or more of cache, RAM, ROM, SRAM, DRAM, RDRAM, EEPROM and other types of volatile or non-volatile memory capable of storing data. The processor unit 1120 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 1140 may include a system bus, LDT, PCI, ISA, or other types of buses, and the communications or network interface may, for example, be an Ethernet interface, a Frame Relay interface, or other interface. The network interface 1130 may be configured to enable a system component to communicate with other system components across a network which may be a wireless or various other networks. It should be noted that one or more components of computing device 1100 may be located remotely and accessed via a network. Accordingly, the system configuration provided in FIG. 11 is provided to generally illustrate how embodiments may be configured and implemented.

Method embodiments may also be embodied in, or readable from, a non-transitory, computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 1120 executes program instructions 1112 within memory 1110 and/or embodied on the carrier to implement method embodiments.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims. Further, where methods described above indicate certain events occurring in certain order, those of ordinary skill in the art having the benefit of this disclosure would recognize that the ordering may be modified and that such modifications are in accordance with the variations of the invention. Additionally, parts of methods may be performed concurrently in a parallel process when possible, as well as performed sequentially. Accordingly, embodiments are intended to exemplify alternatives, modifications, and equivalents that may fall within the scope of the claims.

What is claimed is:

1. A computer-implemented method, comprising:
a computer, by a processor executing computer-executable instructions of a first interface controller of an electronic document preparation application,
accessing a template database defining respective pre-defined and static structures of respective electronic forms of the electronic document preparation application,
identifying an electronic form based at least in part upon input or navigation by a first user of a first computing device utilizing the electronic document preparation application to prepare an electronic document, wherein the at least one electronic form is presented to the first user through a first display of a first computing device;
receiving first electronic data from the first computing device based at least in part upon the first user interacting with the first computing device and the electronic form, and
storing the first electronic data to a shared data store to update current electronic document data of the electronic document;
the computer, by the processor executing computer-executable instructions of an interface content engine,
eliminating, via a decision table data structure, at least one question and an associated portion of the electronic form from the current electronic document data, wherein the decision table data structure includes rows that define rules and columns that define the question and associated portion, and the eliminating involves a first step of removing at least one of the rows with a first predefined value and a second step of removing at least one of the columns based on an output of the first step and a second predefined value, wherein each portion comprises a fillable field, a textual description associated with the fillable field, and a tag associated with the fillable field,
selecting one or more portions from the identified at least one portion of the electronic form for inclusion in a separate interview screen to be generated and presented to a second user different from the first user,
after selecting the one or more portions, the interface content engine
accessing the template database, and
extracting the selected portions from one or more electronic forms of the template database, and
the computer, by the processor executing computer-executable instructions of a second interface controller different from the first user interface controller,
receiving the extracted portions from the interface content engine, and
generating an interview screen comprising the extracted portions, wherein the interview screen is presented to a second user through a second display of a second computing device different from the first computing device,
receiving second electronic data from the second computing device generated by the second user responding to questions of the interview screen by interacting with the second computing device and the generated interview screen, and
storing the second electronic data to the shared data store to update the current electronic document data in the shared data store; and the computer, by the first interface controller,
reading the current electronic document data as updated by the second interface controller, and
presenting one or more electronic forms populated with current electronic document data as updated by the second interface controller to the first user through the first display.

2. The computer-implemented method of claim 1, wherein the second user interface controller executes independently of the first interface controller.

3. The computer-implemented method of claim 1, wherein the same electronic forms having the same respective pre-defined and static structures are presented to respective other users preparing respective other electronic documents through the first interface controller.

4. The computer-implemented method of claim 1, wherein the interview screen is different compared to content and structure of each electronic form of the electronic document preparation application.

5. The computer-implemented method of claim 4, wherein the interview screen is different compared to content and structure of an electronic form by including a different number of questions than the electronic form.

6. The computer-implemented method of claim 4, wherein the interview screen is different compared to content and structure of an electronic form by including a different arrangement of questions than the electronic form.

7. The computer-implemented method of claim 4, wherein the interview screen is different compared to content and structure of an electronic form by excluding at least one question of the electronic form.

8. The computer-implemented method of claim 4, wherein the interview screen is different compared to content and structure of a first electronic form by including at least one question of a different, second electronic form.

9. The computer-implemented method of claim 1, wherein the interview screen presented to the second user comprises:
an extracted portion of a first electronic form, and
an extracted portion of a second electronic form different from the first electronic form,
wherein the first portion and the second portion are aggregated in the interview screen presented to the second user.

10. The computer-implemented method of claim 1, wherein the interview screen presented to the second user comprises:
a first extracted portion and a second extracted portion of a first electronic form, and a third extracted portion of a second electronic form different from the first electronic form,
wherein the first portion, the second portion and the third portion are aggregated together in the interview screen presented to the second user.

11. The computer-implemented method of claim 10, wherein the second user interface controller receives the first extracted portion, the second extracted portion and the third extracted portion without a pre-determined ordering, further comprising the second user interface controller executing sequence rules to determine how the first extracted portion, the second extracted portion and the third extracted portion should be arranged within the interview screen and structuring the interview screen to reflect a result of sequence rule execution.

12. The computer-implemented method of claim 1, wherein the interview screen is structured as a single page comprising extracted portions of respective different electronic forms and that is scrollable in the second display.

13. The computer-implemented method of claim 12, wherein the interview screen is structured to reduce second user interactions with the second computing device required to complete one or more electronic forms.

14. The computer-implemented method of claim 13, wherein the electronic forms are distinct from each other such that respective electronic forms are presented to the first user as separate pages.

15. The computer-implemented method of claim 13, wherein no electronic form of the plurality of electronic forms having respective pre-defined and static structures is presented in an original form of the electronic form through the second display to the second user.

16. The computer-implemented method of claim 1, wherein the interview screen presented to the second user comprises a single question of a single electronic form.

17. The computer-implemented method of claim 1, wherein the interview screen is presented to the second user through the second display but not to the first user through the first display.

18. The computer-implemented method of claim 1, wherein the interview screen is not presented to other preparers of respective electronic documents utilizing the electronic document preparation application.

19. The computer-implemented method of claim 1, wherein the electronic document is an electronic tax return comprising a plurality of electronic forms, and the electronic document preparation application is a computerized tax return preparation application.

20. The computer-implemented method of claim 1, wherein the electronic document is an electronic financial document comprising a plurality of financial or accounting forms, and the electronic document preparation application is a computerized accounting application.

21. The computer-implemented method of claim 1, wherein the electronic document preparation application is an online electronic document preparation application hosted by the computer and accessed by the first computing device executing a browser.

22. The computer-implemented method of claim 1, wherein an electronic message is transmitted from the first computing device of the first user to the interface content engine to trigger execution of the interface content engine and generate the composite interface structure for the second user.

23. The computer-implemented method of claim 1, wherein the interface content engine is hosted by an intermediate computer that is in communication through respective networks with the first computing device and the second computing device and located remotely relative to the first computing device and the second computing device.

24. The computer-implemented method of claim 1, wherein the interface content engine is located remotely relative to the first interface controller and the second interface controller.

25. The computer-implemented method of claim 1, wherein the interface content engine is in communication with the second interface controller but not the first interface controller.

26. The computer-implemented method of claim 1, wherein the interface content engine is triggered to execute based at least in part upon an electronic message received by the second interface controller from the second computing device of the second user.

27. The computer-implemented method of claim 26, wherein a first electronic message is transmitted from the first computing device of the first user to the second computing device of the second user and comprising a link or executable file that is selected by the second user to generate a second electronic message to trigger execution of the interface content engine.

28. The computer-implemented method of claim 1, wherein the interview screen presented through the second display comprises a plurality of fillable fields associated with respective textual descriptions and respective tags, respective components of the second electronic data entered into respective fillable fields of the interview screen and stored to the shared data store by the second user interface controller are also associated with respective tags in the shared data store, and the first user interface controller populates respective fields of an electronic form based at least in part upon tagged current electronic document data in the shared data store.

29. The computer-implemented method of claim 1, wherein respective portions of the data structure are associated with respective tags, wherein the interface content engine selects one or more tagged portions in the template database based at least in part upon tags associated with the respective portions.

30. The computer-implemented method of claim 1, wherein determining one or more portions of one or more electronic forms of the template database for inclusion in the interview screen is executed independently of the template database.

* * * * *